United States Patent
Klein

(10) Patent No.: US 8,122,082 B2
(45) Date of Patent: Feb. 21, 2012

(54) SYSTEM AND METHOD FOR DETECTING A PROXY BETWEEN A CLIENT AND A SERVER

(75) Inventor: Amit Klein, Herzliya (IL)

(73) Assignee: EMC Corporation, Hopkinton, MA (US)

(*) Notice: Subject to any disclaimer, the term of this patent is extended or adjusted under 35 U.S.C. 154(b) by 446 days.

(21) Appl. No.: 11/886,746

(22) PCT Filed: Mar. 26, 2006

(86) PCT No.: PCT/IL2006/000376
§ 371 (c)(1),
(2), (4) Date: Dec. 31, 2008

(87) PCT Pub. No.: WO2006/100684
PCT Pub. Date: Sep. 28, 2006

(65) Prior Publication Data
US 2009/0138538 A1    May 28, 2009

Related U.S. Application Data

(60) Provisional application No. 60/664,704, filed on Mar. 24, 2005.

(51) Int. Cl.
*G06F 15/16* (2006.01)

(52) U.S. Cl. .................................................... 709/203
(58) Field of Classification Search .................. 709/203, 709/201
See application file for complete search history.

(56) References Cited

U.S. PATENT DOCUMENTS

| | | | |
|---|---|---|---|
| 6,446,108 B1* | 9/2002 | Rosenberg et al. | 709/203 |
| 2002/0069241 A1* | 6/2002 | Narlikar et al. | 709/203 |
| 2002/0142769 A1* | 10/2002 | Taylor | 455/426 |
| 2002/0178211 A1* | 11/2002 | Singhal et al. | 709/201 |
| 2003/0195924 A1* | 10/2003 | Franke et al. | 709/203 |
| 2004/0193677 A1* | 9/2004 | Dar et al. | 709/203 |
| 2005/0198310 A1 | 9/2005 | Kim et al. | |
| 2006/0168349 A1 | 7/2006 | Van Geest et al. | |

OTHER PUBLICATIONS

International Search Report for International Application No. PCT/IL06/00376 mailed Apr. 4, 2007.

* cited by examiner

*Primary Examiner* — Jerry Dennison
(74) *Attorney, Agent, or Firm* — Pearl Cohen Zedek Latzer, LLP

(57) ABSTRACT

A method and system for determining whether a proxy is present in a communication link between a client and a server, and if so, certain characteristics of the proxy.

17 Claims, 3 Drawing Sheets

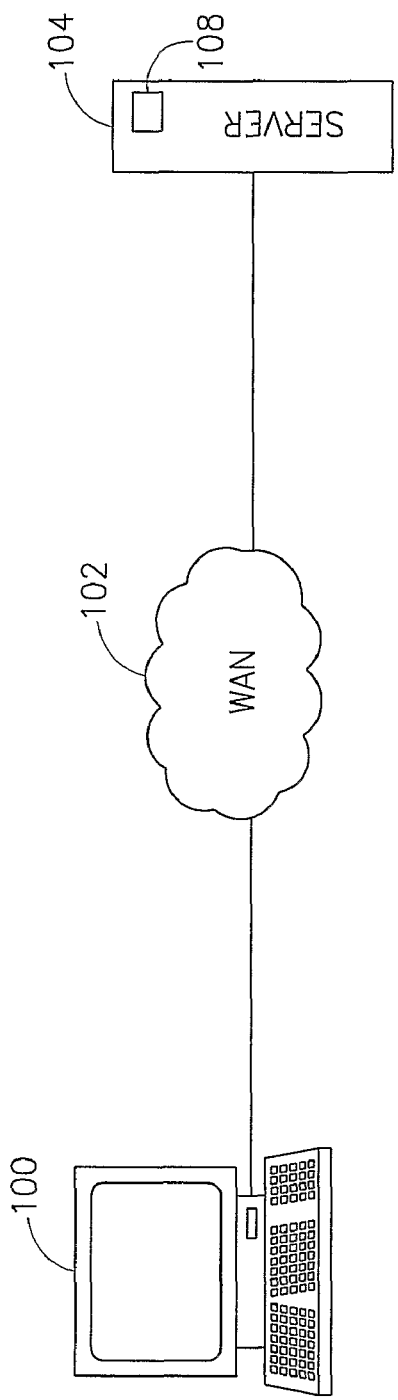
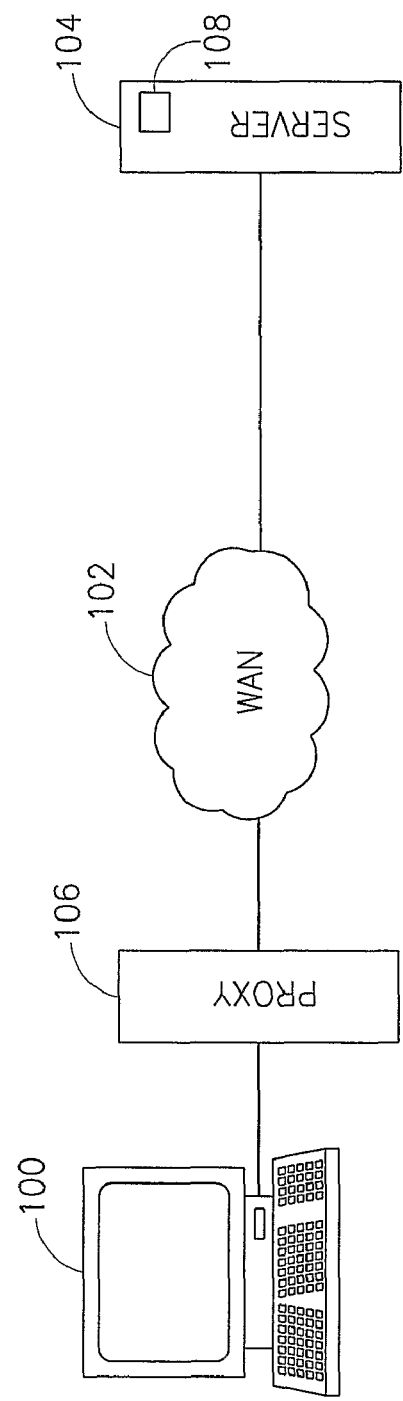

SYSTEM AND METHOD FOR DETECTING A PROXY BETWEEN A CLIENT AND A SERVER

CROSS-REFERENCE TO RELATED APPLICATIONS

This application is a National Phase Application of PCT International Application No. PCT/IL2006/000376, entitled "SYSTEM AND METHOD FOR DETECTING A PROXY BETWEEN A CLIENT AND A SERVER", International Filing Date Mar. 26, 2006, published on Sep. 28, 2006 as International Publication No. WO 2006/100684, which in turn claims priority from U.S. Provisional Patent Application No. 60/664,704, filed Mar. 24, 2005, both of which are incorporated herein by reference in their entirety.

FIELD OF THE INVENTION

The present invention relates generally to network communications, and in particular to detecting the presence of a proxy in a path of communication between a client and a server.

BACKGROUND OF THE INVENTION

A client may interact with a server over a particular protocol or set of protocols. Such an interaction may be direct from the client to the server, or may be channeled through one or more proxy servers, which may relay for example a client's request to the server and the server's response to the client. The presence and nature of a proxy between a server and a client, as well as the number of proxies and their distance from a client may influence factors such as the security, speed and reliability of the interaction between the client and the server. There is therefore a need for a system and method to determine whether a message, request or other instruction sent to a server is sent directly from a client, or whether a proxy is present between the link of a server and a client, and if so, what are characteristics of such proxy.

SUMMARY OF THE INVENTION

Some embodiments of the invention include a method of sending a request to a source address; and determining from a response to the request whether the source address is a proxy. In some embodiments the method includes sending the request over several ports, and monitoring the several of ports for the response. In some embodiments such sending the request includes sending a request including an instruction to perform an action. In some embodiments the determining whether the source address is a proxy includes determining whether the response is an error response. In some embodiments the sending the request includes an instruction to retrieve a resource. In some embodiments, the determining whether the source address is a proxy includes determining whether the response is a refusal of the source address to perform an action. In some embodiments, the request includes a random variable. In some embodiments a method may include refusing to perform an instruction received from the source address upon determining that the source address is a proxy. In some embodiments a method may include receiving an initial request from the source address.

In some embodiments, a method may include measuring a response time to an instruction sent to a request source address; and determining based on the response time whether the request source address is a proxy. Some embodiments may include sending a request to the request source address, where the request is an instruction to perform an action that generates an error message and an instruction to send data of a time measured at a client between a performance of the action and a generation of the error message. In some embodiments, the method may include calculating a time elapsed between the performance of the action and the generation of the message, and comparing a result of such calculation to an estimate of a time required for a client to request a proxy to perform the action and to receive the error message in response to such request. In some embodiments, the method includes determining a distance of the proxy from the request source address.

Some embodiments may include a system having a processor linked to a network, where the processor is to send a request to a request source address; and determine from a response to the request that the request source address is a proxy. In some embodiments the processor is to transmit the request over several ports and to monitor the ports for said response. In some embodiments, the processor is to include in the request an instruction to retrieve a resource. In some embodiments, the processor is to determine that the response is a refusal of the request source address to perform an action. In some embodiments, the processor is to insert a random variable into the request.

Some embodiments of the invention include a program having commands that when executed by a processor result in measuring a response time to an instruction sent to a request source address and determining whether the request source address is a proxy. In some embodiments, the commands include sending a request to a request source address, where the request includes an instruction to perform an action that generates an error message, and an instruction to send data of a time between a performance of the action and a generation of the error message. In some embodiments, such commands include determining if said proxy is close to said request source address.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 1A is a conceptual illustration of a direct link between a client and a server in accordance with a preferred embodiment of the present invention;

FIG. 1B is a conceptual illustration of a link between a client, a proxy and a server in accordance with a preferred embodiment of the present invention;

DETAILED DESCRIPTION OF THE PREFERRED EMBODIMENTS

Figure 2:
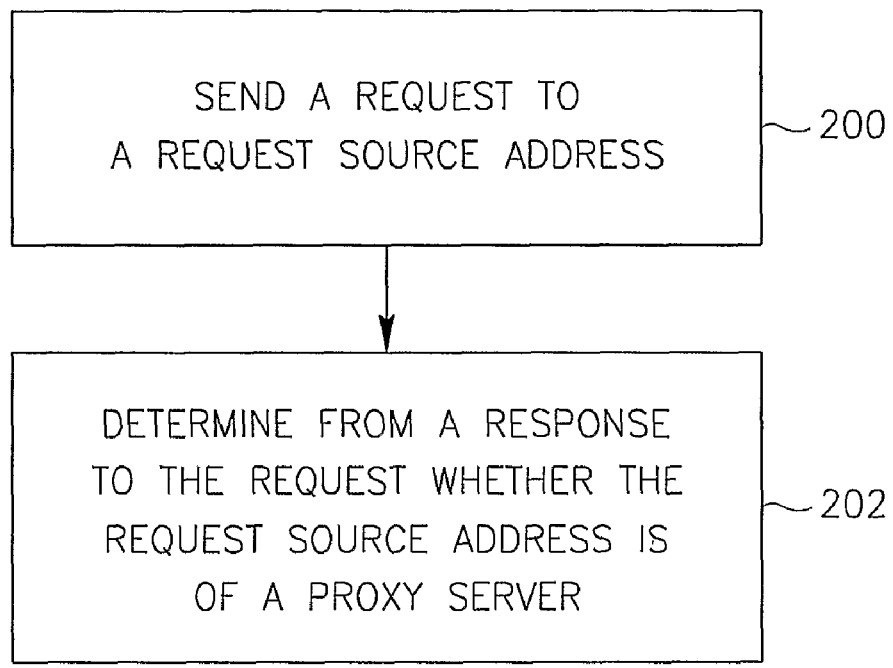
FIG. 2 is a flow chart of a method of determining whether a proxy is in a link from a client to a server by evaluating a response to a request to a request source address in accordance with an embodiment of the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features or processes may be omitted or simplified in order not to obscure embodiments of the invention described herein.

Unless specifically stated otherwise, as apparent from the following discussions, it is appreciated that throughout the specification, discussions utilizing terms such as "selecting," "processing," "computing," "calculating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network, output device or other apparatus. Embodiments of the invention described herein are not described with reference to any particular programming language, machine code, etc. It will be appreciated that a variety of programming languages, networks, systems, protocols or hardware configurations may be used to implement the teachings of the embodiments of the invention as described herein. For example, embodiments of the invention may be practiced with a client that may be use an HTTP browser and where a server is a web server. A proxy may be or included for example a forward proxy server or SOCKs proxy server or other kind of server, software or combination hardware and software. In some embodiments, an embodiment of the invention may be practiced through the execution of one or more instructions or commands that may be stored for example on an article such as a mass storage unit.

Reference is made to FIG. 1A, a conceptual illustration of a direct link between a client and a server, and to FIG. 1B a conceptual illustration of a link among a client and a server with a proxy between the client and the server, in accordance with an embodiment of the present invention. In FIG. 1A, a client 100, such as a client computer, computing device, email transmission device, communication device or other device having a processor 108 that may communicate with a network, such as for example a wide area network (WAN) 102 such as the Internet, may include or run for example a browser or other software that may receive, send, execute or transmit for example requests for resources. In some embodiments, responses to such requests for resources may be delivered to client 100 over for example WAN 102. In some embodiments, requests from client 100 by way of a browser or other software may be transmitted over WAN 102 along with an address or other designation of such client 100 that indicates that client 100 is the source of the request, and that may be used by a server 104 or other link in a network to direct the response back to the client 100 as the source of the request. In some embodiments, client 100 may direct a request for a resource or for the performance of an action directly to a server 104 or to another link or address that may be linked to WAN 102. In some embodiments, server 104 may receive such request and may transmit a resource to the request source address of client 100.

In some embodiments, a resource request address may be or include an IP address, though other designations of an address or identity or client or device linked to a network are possible.

Referring to FIG. 1B, in some embodiments, a client 100 may receive, send, execute or transmit for example requests for resources or other actions from links or addresses connected to WAN 102, by way of a proxy 106. In some embodiments, proxy 106 may be or include a computer, server, gateway, firewall, workstation or other component or hardware, software or combination of hardware and software, that may receive requests for resources from client 100, and may transmit such requests over WAN 102 to server 104, using an address of proxy 106 rather than an address of client 100. In some embodiments, the presence of proxy 106 may not be known to a user of client 100. In some embodiments, when a resource is returned to proxy 106, proxy 106 may relay the resource to client 100. In some embodiments, server 104 which may be called upon to provide a resource requested by client 100, may receive only an address of proxy 106, rather than the address of the actual request source, such as client 100. In some embodiments, more than one proxy 106 may relay a request, such that server 104 may receive the address only of the last proxy 106 in the chain of proxies 106 that may lead to or from client 100. Other paths of relaying a request from a client 100 to a provider of a resource are possible.

In some embodiments, proxy 106 may be close to client 100, such as when a client 100 is linked in a corporate or campus connection to a central proxy 106 that may for example facilitate connections of many clients 100 to a WAN 102. Similarly, some internet service providers or cable operators may use a proxy 106 as part of a link of client 100 to WAN 102. Such proxies 106 may be called close proxies since they are generally up to several or less than 100 miles away from client 100. In some embodiments, proxy 106 may be located at a distance from client 100, such as in cases where client 100 may be sending a request through a far away proxy 106 in order to mask an identity of client 100. Distant proxies 106 may be more than 100 miles away from client 100.

In operation, a method or system of embodiments of the invention may include transmitting a message from server 104 to a request source address, and assessing whether a proxy is present in a link between server 104 and such request source address from a response generated in respect of such message. In some embodiments, a response to such message may include an elapsed time between the message and the response, and such elapsed time may be used to determine the presence of a proxy 106, how many proxies 106 may be present, and for example where such proxies 106 may be located relative to client 100.

Reference is made to FIG. 2, a flow chart of a method in accordance with an embodiment of the invention. Referring to block 200, and in some embodiments of the invention, server 104 or some other link connected to network 102, that may receive a request or other message or transmission from a request source address, may send back to such address a request for an action to be taken by a computer or other device at such request source address. In some embodiments, such request that is sent back to the request source address may be sent on or over one or more ports, such as one or more ports that are generally used for communications or transmissions over WAN 102. For example, server 104 may send a message or request over ports or request formats such as 8000, 8080, 6588 as are frequently used for transmissions on the world wide web, and server 104 receive data and/or responses from those ports. Other ports may be used, and the message from server 104 may be sent over many ports.

In some embodiments, the message sent to a request source address may include a request to the request source address to retrieve a resource or perform another action. In some embodiments, client 100 that may be running a browser will not respond to the request that was posed by server 104 to the request source address or may flag an error or exception to such request. On the other hand, proxy 106 that may receive such request may respond with any of an error message, a message indicating that request cannot be served, or some other response. Such responses may be taken as an indication that the request source address is an address of a proxy 106, rather than of client 100.

For example, when a method of an embodiment of the invention is practiced using an HTTP protocol, over for example a TCP/IP network, and where a client 100 may be or be running for example an HTTP browser, a server 104 such as a server with a web address of www.server.site, may transmit a request to a request source address that may be similar in function to the following:

```
GET http://www.server.site/ HTTP/1.1
Host: www.server.site
```

The request may be transmitted over several ports on which server 104, such as a server at www.server.site may monitor a transmission sent back in response to the request, and may monitor the nature of such response. For example, and as described above, a response may be one of an error message, an 'unauthorized request' or the satisfaction of the requested resource. Other responses may be possible.

Referring to block 202, and in some embodiments, receipt of one of the aforementioned responses may considered as part of a determination of whether a request source address is a proxy 106 or a client 100.

In some embodiments, server 104 may send a message to a request source address on a port on which a proxy 106 most likely does not listen. For example, a request from server 104 to a request source address may include a request on a port such as for example—12345, 33333, etc. In some embodiments, a proxy 106 will respond to such request with a valid response but with an abnormal status such as for example "HTTP/1.0 502 Bad Gateway", "HTTP/1.0 403 Forbidden". A browser of client 100 will likely yield an error or exception. Server 104 or some other component such as a processor may on the basis of such response determine whether the request source address is a client 100 or a proxy 106.

In some embodiments, a random number or variable may be added to the request to avoid caching of the response by proxy 106.

An example of Javascript code that may perform such an embodiment of the invention, for a proxy 106 that does not listen on port 12345, may include the following:

```
<script>
// conn_type contains the connection type (direct/proxy)
var conn_type="proxy";
try
{
    // Construct a request for a non-listening port (12345)
    // Randomize the request to avoid caching of the response
    var xhr = new ActiveXObject("Microsoft.XMLHTTP");
    xhr.open("GET",
    "http://www.server.site:12345/nosuchpage"+Math.random( ), false);
    xhr.send( );
}
catch (exception)
{
```
```
    // Exception means the browser handled the request
    conn_type="direct";
}
// Deposit the result (conn_type) at the server by hitting "detect.cgi"
window.open('http://www.server.site/detect.cgi?'+conn_type);
</script>
```

In some embodiments, a Javascript security model and the restrictions placed on the use of the XmlHttpRequest object, should arrive from the same server to which the XmlHttpRequest object sends the request, i.e. the page should reside on www.server.site.

In some embodiments server 104 may send a message to a request source address that includes a request or data to the request source address that causes the request source address to generate an immediate or almost immediate error message or that generates an error message by the request source address in a known time period. For example, the request may refer to an unknown or non-defined resource, or may request some other action that may generate an immediate response. The request by the server to the request source address may also include an instruction to respond to the server with a message that includes the time that the request was received or processed by the request source address, and the time that the error message was received by the client 100. In some embodiments, such a message may include the time elapsed between the receipt of the request, and the time of the receipt of the error message by client 100. In some embodiments, such elapsed time may indicate whether a proxy 106 is present in a link between a client 100 and a server 104. In some embodiments, the instruction may send the time measurement by an HTTP request which includes the time as part of the URL.

In some embodiments, an elapsed time between the receipt of the request, and the time of the receipt of the error message by client 100 may indicate a distance between client 100 and proxy 106. For example a short time between the request and the receipt of the error message may indicate that proxy 106 is close to client 100. A longer lapse of time may indicate that proxy is far from client 100.

Figure 3:
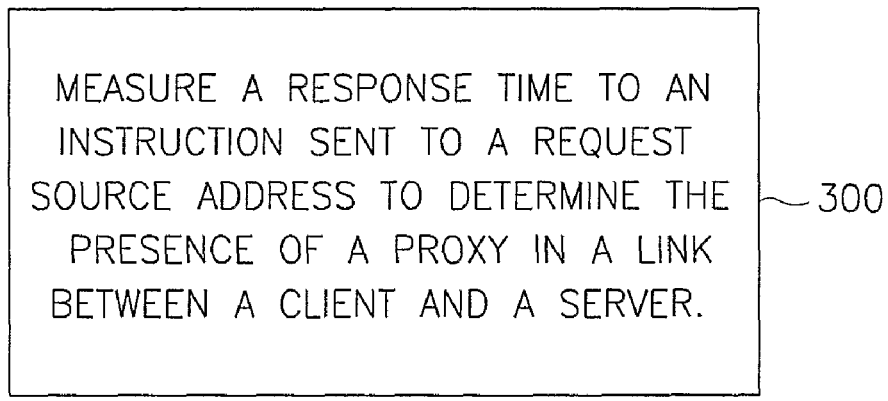
FIG. 3 is a flow chart of a measuring of time elapsed before an error is generated, in accordance with an embodiment of the invention.

Reference is made to FIG. 3, a flow chart of a measuring of time elapsed before an error is generated, in accordance with an embodiment of the invention. In block 300, a time elapsed between when an instruction is received by a request source address, and when an error is generated to such request, as such time is measured at the client or request source address, may be measured to determine whether such request source address is a proxy.

For example, if there is no proxy 106 in a link between a client 100 and a server 104, the request source address may send the request received from server 104 to a resource and receive a response immediately, such that very little time is spent in fetching or attempting to fetch the requested resource. In some embodiments, an immediate response may be a response generated within for example 100 milliseconds. Other time frames are possible.

If there is a proxy 106 in a link between for example a client 100 and a server 104, the client 100 may forward the request to the proxy 106, and the proxy 106 may attempt to fulfill the request. As before, an error message will be generated on the request, and proxy 106 will send the error back to client 100. Client 100 may in some embodiments, send the error message, and/or time data that may include the time of the request and the time or its receipt of the error message. In the presence of proxy 106, the time elapsed may be similar to the expected time of a round trip from client 100 to proxy 106 and back to client 100. For example, in some embodiments, an elapsed time for the generation of an error, as measured on client 100, may be 1,000 milliseconds, or several times the expected time required to generate the error message. The client 100 may send a response back to server 104, where such response includes time data such as a time period elapsed between the processing of a request and the time of the generation of an error in response to the request. In this way, server 104 or some other link may, by measuring the network latency or the time lag between the receipt a request and the generation of an error response to a request, may be used to determine the presence of a proxy 106 in a link between client 100 and server 104.

In a preferred embodiment of the invention, the address to which server 104 sends a request may be the address of the last proxy 106, i.e. the proxy 106 that is farthest from client 100.

In some embodiments, an example of a request that may generate an immediate error may be a request to retrieve from a resource on the address 127.0.0.0 which is an IP address that is not resolved into MAC address.

A sample of a Javascript that may be included in a message sent from a server 104 to a request source address in an embodiment of the invention, is as follows:

```
<script>
// Start time measurement
var t0 = new Date( );
</script>
<img src="http://127.0.0.0/foo.gif" onerror="javascript:
    var t1 = new Date( ); // 'stop' time measurement
    var delta_t = t1.getTime( )–t0.getTime( ); // time elapsed [msec]
    // Report delta-time to server by hitting measure.cgi:
    window.open('http://www.server.site/measure.cgi?'+delta_t);
">
```

In some embodiments, if a determination is made that proxy 106 is present in a link between client 100 and server 104, an instruction may be given to reject or not perform one or more of a class of transactions. For example, in some embodiments, server 104 may not perform an action or retrieve a resource that involved confidential, secure, financial or other sensitive data.

Figure 4:
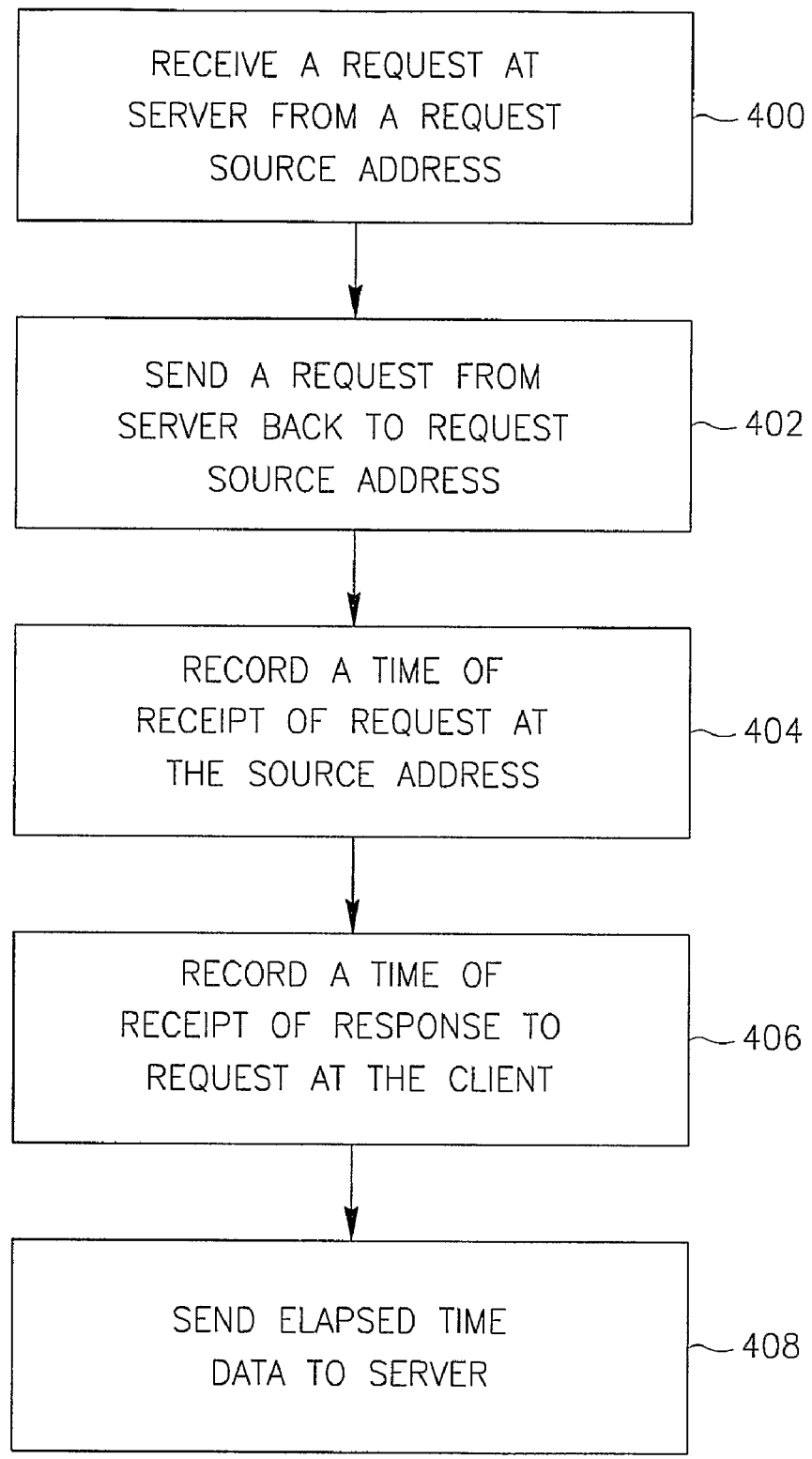
FIG. 4 is a flow chart of a method in accordance with an embodiment of the invention.

Reference is made to FIG. 4, a flow chart of a method in accordance with an embodiment of the invention. In block 400, a message may be received at a server from a request source address. In block 402, the server that received the request may send a request back to the request source address. Such return message may include a request to fetch a resource, where such resource or request are intended to generate an immediate response such as an error response from the computer that is processing the request. The request may also include an instruction to record the time that the request source address receives the request and the time that it receives the error response to such request. In block 404 the time of the receipt of the instruction by the client may be recorded. If there is no proxy in the link between the client and the server, the client will generate an immediate response such as an error response. In block 406, the time that the error message is received by the client may be recorded.

If there is a proxy in a link between a client and a server, the request may be passed to the proxy, and the error message then passed back to the client from the proxy. The time lapse between the receipt of the message by the client and the receipt of the error message by way of the proxy will be longer than if the message would have been generated by the client.

In block 408, the time data may be sent back to the server, and a determination as to the presence of the proxy, the numbers of proxies that may be present in the link and the distance of such proxies from the client, may in some embodiments be determined from the time data.

It will be appreciated by persons skilled in the art that embodiments of the invention are not limited by what has been particularly shown and described hereinabove. Rather the scope of at least one embodiment of the invention is defined by the claims below.

What is claimed is:

1. A method comprising:
   sending, by a computer, over a communication network, a request to a source address, said request including an instruction to perform an action that generates an error message, and an instruction to send data of a time measured at a client between a performance of said action and a generation of said error message; and
   determining, by said computer, based on a response to said request whether said source address is associated with a proxy.

2. The method as in claim 1, wherein said sending said request comprises
   sending said request over a plurality of ports; and
   monitoring said plurality of ports for said response.

3. The method as in claim 1, wherein said determining whether said source address is a proxy comprises determining whether said response is a refusal of said source address to perform said action.

4. The method as in claim 1, wherein said request comprises a random variable.

5. The method as in claim 1, comprising refusing to perform an instruction received from said source address upon determining that said source address is a proxy.

6. The method as in claim 1, comprising receiving an initial request from said source address.

7. A method comprising:
   measuring, by a computer, a response time to an instruction sent over a communication network to a request source address, said request including an instruction to perform an action that generates an error message, and an instruction to send data of a time measured at a client between a performance of said action and a generation of said error message; and
   determining, by the computer, based on said response time whether said request source address is a proxy.

8. The method as in claim 7, comprising calculating, by the computer, a time elapsed between said performance of said action and said generation of said message, and wherein determining whether said request source address is a proxy comprises comparing a result of said calculation to an estimate of a time required for a client to request a proxy to perform said action and to receive said error message in response to said request.

9. The method as in claim 8, comprising determining, by the computer, a distance of said proxy from said request source address based on said response time.

10. A system comprising a processor linked to a network, said processor to send a request to a request source address, said request including an instruction to perform an action that generates an error message, and an instruction to send data of a time measured at a client between a performance of said action and a generation of said error message; and determine from a response to said request that said request source address is a proxy.

11. The system as in claim 10, wherein said processor is to transmit said request over a plurality of ports and to monitor said plurality of ports for said response.

12. The system as in claim 11, wherein said processor is to include in said request an instruction to retrieve a resource.

13. The system as in claim 10, wherein said processor is to determine that said response is a refusal of said request source address to perform an action.

14. The system as in claim 10, wherein said processor is to insert a random variable into said request.

15. An article comprising a non-transitory computer-readable storage medium, having stored thereon commands that when executed by a processor result in measuring a response time to an instruction sent to a request source address, said request including an instruction to perform an action that generates an error message, and an instruction to send data of a time measured at a client between a performance of said action and a generation of said error message, and determining whether said request source address is a proxy.

16. The article as in claim 15, wherein said commands when executed result in calculating a time elapsed between said performance of said action and said generation of said message, and determining whether said request source address is a proxy by comparing a result of said calculation to an estimate of a time required for a client to request a proxy to perform said action and to receive said error message in response to said request.

17. The article as in claim 15, wherein said commands when executed result in determining if said proxy is close to said request source address based on said response time.

* * * * *